Figure 1:
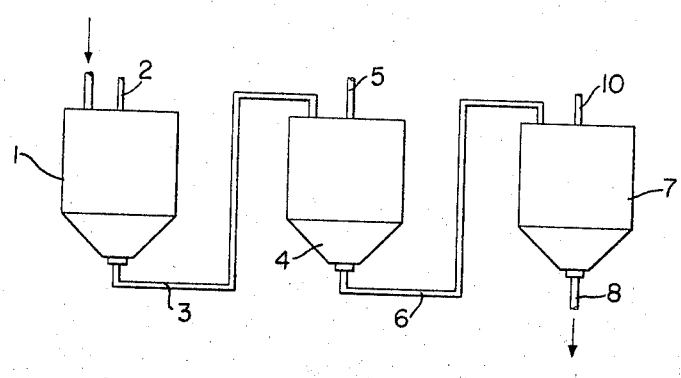

Sept. 10, 1968        W. J. CARNEY        3,401,150

METHOD OF PREPARING CONDENSATION POLYESTER RESIN

Original Filed April 20, 1960

INVENTOR.
WILLIAM J. CARNEY

BY

*J B Holden*
ATTORNEY

United States Patent Office 3,401,150
Patented Sept. 10, 1968

3,401,150
METHOD OF PREPARING CONDENSATION
POLYESTER RESINS
William J. Carney, Akron, Ohio, assignor to The Goodyear Tire & Rubber Company, Akron, Ohio, a corporation of Ohio
Continuation of application Ser. No. 23,451, Apr. 20, 1960.
This application July 2, 1965, Ser. No. 477,063
7 Claims. (Cl. 260—75)

This application is a continuation of pending application Ser. No. 23,451, filed Apr. 20, 1960, now abandoned.

This invention relates to a method of carrying out reactions in which materials in a reacting mixture become thicker and the system more resistant to agitation as the reactions proceed. More particularly, the invention relates to a method and apparatus for polymerizing reactants that form high molecular weight materials.

In the preparation of polymeric materials, particularly in the production of condensation polymers such as polyesters and polyamides, the materials to be reacted are charged into a reaction vessel where they are stirred by an agitator such as a rotating paddle or propellor. In the usual system heat is supplied to the reaction vessel by a suitable means, the pressure is regulated so that volatile materials are removed as the reactants are stirred and the reaction is run for a predetermined length of time when the product is discharged from the reactor.

As such polymerization reactions proceed the average molecular weight of the polymer in the system increases and the power required to turn the agitator increases as the molecular weight increases. If the agitator rotates constantly at a high rate of speed it is found that the power used in turning the agitator increases to a maximum and then decreases indicating that the agitator is channelling or cutting through the reactants without actually stirring them and that degradation of the polymer is occurring. If the agitator speed is slow, the power required to turn the agitator gradually increases but generally does not show the maximum followed by the decrease shown in systems where the agitator speed is high. However, at slow agitator speeds the time required for the reacting mixture to form high molecular weight polymers is long and some degradation occurs due to the long exposure of the materials to heat.

Various techniques have been tried in attempts to obtain polymers of desired molecular weight in reasonably short reaction times that could be reproduced from batch to batch. For example, low pressures are generally used so that volatile materials can be removed from the reacting mixture at a faster rate. Sparging of the reaction mixture with an inert gas such as nitrogen and the use of inert hydrocarbon distillation carriers have also been tried to assist in the removal of volatile materials. In addition, high temperatures have been used to speed up the reactions but degradation reactions which occur at high temperature cause discoloration and lower the quality of the product.

It is an object of this invention to provide an improved method for carrying out reactions in which materials in a reacting mixture become thicker and offer more resistance to agitation as the reactions proceed. It is another object to provide a method for preparing polymeric materials by condensation reactions in which the degree of polymerization can be readily duplicated from batch to batch. It is another object to provide a method for controlling polymerization reactions whereby degradation reactions are minimized and polymeric materials of improved color are obtained. It is another object to provide an improved method for carrying out condensation polymerization reactions in short reaction times. It is still another object to provide an improved apparatus for carrying out such reactions. Other objects will appear hereinafter as the description of the invention proceeds.

It has been found that in the preparation of materials which get thicker and offer greater resistance to agitation as they are stirred by a rotating agitator the reactions can be run quickly and efficiently by supplying power to the agitator at a constant energy level throughout those stages of the reaction in which the reaction mixture is thick enough to offer much resistance to the passage of an agitator therethrough. The temperature of the reacting mixture is controlled and when heat is generated by stirring a suitable cooling means is employed to remove heat from the reactants. Thus the present invention comprises the method in which agitation power input and reactant temperature are controlled so that the reactions are run quickly and efficiently.

This invention is applicable to polymerization systems generally. It will be illustrated with respect to the production of linear polyesters by ester interchange and condensation reactions and particularly with respect to ethylene terephthalate-ethylene isophthalate copolyesters. In the preparation of these copolyesters esters such as dimethyl terephthalate and dimethyl isophthalate are reacted with ethylene glycol under ester interchange conditions in the presence of a catalyst whereby methanol is liberated and the bis glycol esters or low polymers thereof are formed. These bis glycol esters are then subjected to condensation reaction, with the elimination of ethylene glycol to form high molecular weight linear polyesters. The ester interchange reactions are generally carried out at temperatures of from about 100° C. to about 230° C. The condensation reactions are carried out at temperatures of from about 200 to about 280° C. at pressures of from about 0.1 to about 5 millimeters of mercury pressure, usually under an atmosphere of inert gas such as nitrogen.

The reactants in the ester interchange step of the process are monomeric materials that are mobile liquids at the temperatures of the ester interchange process and offer little or no resistance to an agitator. They are easily mixed by ordinary methods. The present invention is concerned with the condensation stage of the process in which the reactants polymerize to high molecular weight materials, and as the molecular weight increases they offer more resistance to the agitator and are more difficult to thoroughly mix. Thorough mixing and constant exposure of fresh surface of reactants are thought to be essential for the removal of glycol produced in the condensation stage of the process to produce high molecular weight polymer of uniform quality.

Stirring the reactants at a constant rate gives varying results and the results depend to a great extent on the speed of agitation. Thus, stirring throughout the reaction at a high speed, for example at 100 to 110 r.p.m. causes some overheating of the batch and accurate control of the polymerization reaction is difficult. Stirring throughout the reaction period at a speed of 20 r.p.m. gives fairly reproducible results but some difficulty is caused by foaming of the reaction mixture. Reaction times at 20 r.p.m. are from ½ to 1 hour longer to attain an intrinsic viscosity of approximately 0.650 than at 100 r.p.m. Agitation at an intermediate speed of 50 r.p.m. gives better results than at either extreme but reaction times are longer than for higher speed runs.

It was surprising to find that no single speed of agitation run gave optimum reproducible results. Merely stepping down the agitation speed during the runs from a fast to a slow speed, for example running at 100 to 110 r.p.m. during the first part of the condensation and then reducing the speed to 50 r.p.m. gave little improvement.

Referring now to FIG. 1, the apparatus used in carrying out the ester interchange process for preparing high molecular weight linear condensation polyesters comprises a glycolysis reactor 1 equipped with a stirrer 2 and a line 3 through which material in the glycolysis reactor 1 is transferred to the prepolymerizer 4. The prepolymerizer is also equipped with a stirrer 5 and a line 6 through which material is transferred from the prepolymerizer 4 to the polymerizer 7, which is shown in greater detail in FIG. 2.

Figure 2:
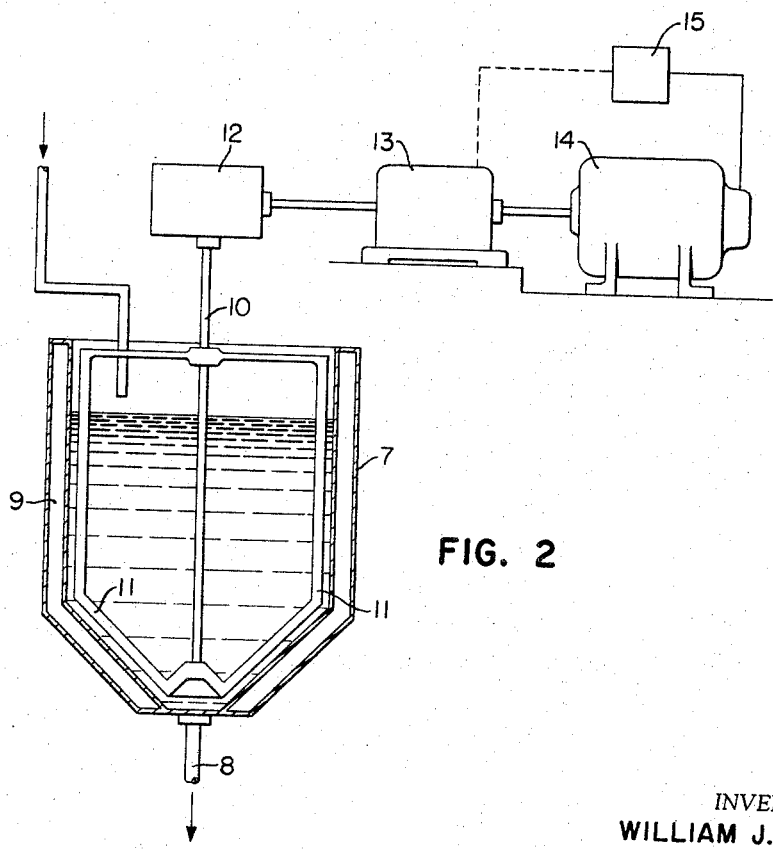

Referring now to FIG. 2, the apparatus comprises the polymerizer 7 having a discharge port 8 and a hollow jacket 9 through which fluid is circulated to regulate the temperature of the polymerizer and the material it contains. A U-shaped agitator 10 is suspended in the polymerizer 7. The blades 11 of the U-shaped agitator 10 are mounted in spaced relationship to the walls of the polymerizer 7. The U-shaped agitator 10 is connected through gear reducer 12 to a variable speed drive 13 which regulates the speed of rotation of the agitator 10. The variable speed drive 13 is turned by motor 14 and itself turns the agitator 10 by turning the gears not shown in the gear reducer 12. Power is supplied to the drive motor 14 at a predetermined energy level which is controlled through power controller 15. As the material in the polymerizer 7 thickens it requires more power to turn the agitator 10 at a given speed. The agitator speed is reduced to maintain the power requirements constant by means of the power controller 15 and the variable speed drive 13 as the polymerization reactions proceed.

The process will be described with particular respect to the apparatus used. Referring now to Example 1 and FIG. 1, 1620 parts by weight of dimethyl terephthalate, 180 parts by weight of dimethyl isophthalate, and 1270 parts by weight of hot ethylene glycol were charged into glycolysis vessel 1 equipped with stirrer 2. The mixture was stirred and heated to a temperature of from about 120 to 125° C. 0.0505 part by weight of ethylene glycol titanate which contained 25.4 percent by weight of titanium and 0.647 part by weight of zinc acetate dihydrate were added as catalysts and the temperature was raised to about 135° C. where the ester interchange action started. As methanol was evolved it was taken off through a condenser not shown. The temperature was slowly raised over a two-hour period to about 215° C. The glycolysis reaction was considered to be complete when approximately the theoretical amount of methanol had been collected. The product, consisting chiefly of the bis glycol esters, was then transferred through line 3 to the prepolymerizer 4 which was also equipped with a rotating agitator 5.

In the prepolymerizer 4 the batch was stirred and the pressure was slowly reduced to about 5 millimeters of mercury pressure (absolute) and the temperature was raised to about 190° C. Free ethylene glycol was distilled out of the reaction mixture through a condenser not shown. The product obtained was a relatively mobile fluid.

The reaction mixture was then transferred from the prepolymerizer 4 through line 6 to the polymerizer vessel 7. The equipment used in the polymerizing step is shown in detail in FIG. 2. The material transferred into polymerizer 7 was stirred by the U-shaped agitator 10. The pressure in the polymerizer vessel 7 was reduced to about one-tenth of a millimeter of merucry pressure and the temperature of the reaction mixture raised so that the condensation reaction was carried out at a temperature in the range of from 430 to 560° F.

When the product from the prepolymerizer 4 was first charged into the polymerizer 7 the speed of rotation of the agitator 10 was set by means of the variable speed drive 12 to turn at a rate of from 102 to 104 revolutions per minute. The power controller 15 was set so that the maximum power supplied to the agitator drive motor 14 would not exceed 24 kilowatts. During the first part of the reaction the speed of rotation of the agitator 10 remained within the range of from 102 to 104 revolutions per minute and the power requirements were low as can be seen by referring to the data from Example 1. As the polymerization progressed the batch thickened and the power required to turn the agitator 10 increased until it reached the 24 kilowatt level. At this point a signal to the power controller 15 caused the speed of the agitator 10 to be reduced to keep the power required by the agitator at approximately 24 kilowatts. From this point on as the batch polymerizes further the agitator speed is gradually reduced while the power requirement remains essentially constant. The temperature of the material in the polymerizer was regulated by circulating a cooling fluid through the hollow jacket 9 of the polymerizer 7. The batch of polymer was discharged from the polymerizer 7 through discharge port 8 when the speed was reduced to 35 r.p.m. The point at which the batch was discharged had been previously figured by calibrating the reactor using the same agitator and the same batch size of the same reactants.

By the method of this invention which comprises controlling the power input to the agitator, reproducible results are obtained from batch to batch. The power-requirement stirrer-speed factors will vary with the temperature at which a batch is run, the batch size, the polymer composition, the shape of the agitator, and the shape and size of the polymerization vessel used. Once these relationships have been determined for a particular polymer, a particular batch size, and a particular apparatus, inherent viscosity of the polymer prepared can be reproduced from batch to batch within very narrow limits.

EXAMPLE 1

| Time in minutes | Pressure (millimeters of mercury) | Agitation speed (r.p.m.) | Power (kw.) |
| --- | --- | --- | --- |
| 0 | 2.2 | 80 | 7.0 |
| 7 | 2.0 | 104 | 14.5 |
| 12 | 1.8 | 104 | 15.5 |
| 22 | 1.3 | 103 | 17.5 |
| 32 | .5 | 102 | 20.0 |
| 42 | .2 | 102 | 22.5 |
| 52 | .15 | 98 | 24.0 |
| 62 | .1 | 92 | 24 |
| 72 | .2 | 85 | 23.5 |
| 82 | .05 | 78 | 23.5 |
| 92 | .05 | 73 | 24.0 |
| 102 | .1 | 69 | 24.0 |
| 112 | .1 | 64 | 23.5 |
| 122 | .1 | 62 | 24 |
| 132 | .05 | 58 | 24.0 |
| 142 | .05 | 54 | 24.0 |
| 152 | .05 | 51 | 24.0 |
| 162 | .05 | 48 | 24.0 |
| 172 | .05 | 44 | 24.0 |
| 182 | .05 | 42 | 24.0 |
| 192 | .05 | 41 | 24.0 |
| 202 | .05 | 38 | 24.0 |
| 212 | .05 | 37 | 24.0 |
| 222 | .05 | 35 | 24.0 |
| 227 | .03 | 35 | 24.0 |

Examples 2 and 3 which follow are smaller batches which were run in a smaller reactor using in Example 2 slow speed agitation throughout the run and in Example 3 using high speed agitation in the beginning of the run with slower speed in the later stages. These examples show the increasing power requirements and longer reaction times which are typical of such reaction procedures.

EXAMPLE 2

| Time in minutes | Pressure (millimeters of mercury) | Agitation speed (r.p.m.) | Power (kw.) |
| --- | --- | --- | --- |
| 0 | 150 | 99 | .95 |
| 2 | 10 | 23½ | .25 |
| 37 | 2.95 | 23½ | .3 |
| 69 | 3.0 | 23½ | .3 |
| 80 | 2.9 | 23½ | .3 |
| 87 | 1.7 | 23½ | .3 |
| 94 | 1.5 | 23½ | .4 |
| 185 | 1.6 | 23½ | .55 |
| 110 | 1.6 | 23½ | .59 |

EXAMPLE 3

| Time in minutes | Pressure (millimeters of mercury) | Agitation speed (r.p.m.) | Power (kw.) |
| --- | --- | --- | --- |
| 0 | 300 | 100 | .8 |
| 21 | 30 | 100 | .8 |
| 52 | .7 | 100 | 1.0 |
| 85 | .55 | 100 | 1.5 |
| 107 | | 100 | 2.0 |
| 121 | 2.0 | 28 | .3 |
| 157 | 0.44 | 29 | 0.32 |
| 187 | 0.43 | 28.8 | 0.40 |
| 218 | 0.45 | 29.8 | 0.50 |
| 248 | 0.44 | 29.8 | 0.54 |
| 278 | | 29.8 | 0.58 |

The method and apparatus of the invention are generally useful for the preparation of materials which thicken while being stirred and as the reactions proceed. The method is particularly useful in processes for preparing condensation polymers such as linear polyamides, linear polyesters and alkyd resins in which the materials increase in molecular weight and thicken and offer more resistance to stirring as the polymerization reactions proceed. The method is especially useful in the preparation of high molecular weight polyesters for use in fibers and films. Representative examples of such polyesters are ethylene terephthalate, ethylene terephthalate-ethylene isophthalate copolyesters, ethylene terephthalate-2,2-bis[4(beta hydroxyethoxy)phenyl]propane terephthalate copolyesters, cyclohexane dimethanol terephthalate and in general polyesters and copolyesters of organic dicarboxylic acids and glycols. The preferred copolyesters for use in the method of the invention are the ethylene terephthalate-ethylene isophthalate copolyesters having an ethylene terephthalate to ethylene isophthalate ratio in the range of 90/10 to 40/60. The most preferred copolyesters are the ethylene terephthalate-ethylene isophthalate copolyesters in which ethylene terephthalate units to ethylene isophthalate units ratio is in the range of from 90/10 to 60/40.

The invention provides a method for producing high molecular weight polyesters in short reaction times. By stirring as rapidly as possible at the power input selected and removing any heat generated by stirring temperature control is easier and degradation reactions are minimized so that polyesters of improved color are obtained. Quality control is improved and good reproducibility from batch to batch is obtained.

Various catalysts can be used for the ester interchange and condensation catalysts in the place of those used in the examples. Representative examples of such catalysts are the alkali metals, lithium, sodium, and potassium, metal hydrides, zinc acetate, antimony trioxide, litharge, magnesium oxide and magnesium carbonate. The catalysts can be used alone but if preferred can be used in mixtures. For example it may be desirable to use a mixture of an ester interchange catalyst such as the alkali metals, alkali metal alcoholates or zinc acetate for the ester interchange reaction and a catalyst such as litharge, antimony trioxide or ethylene glycol titanate for the condensation reaction.

While certain representative embodiments and details have been shown for the purpose of illustrating the invention, it will be apparent to those skilled in this art that various changes and modifications may be made therein without departing from the spirit or scope of the invention.

What I claim is:

1. The process of preparing high molecular weight condensation polyester resins which comprises subjecting a polyester-forming reaction mixture to condensation at elevated temperature and reduced pressure in liquid state, said mixture increasing in viscosity as it condenses while mixing said mixture with a rotating agitator and supplying power to the agitator at an increasing energy level until the power required to turn said agitator at the rate of rotation being used attains a desired level and thereafter turning said agitator by supplying energy to said agitator at a constant rate to turn said agitator while slowly reducing the rate of rotation of the agitator to maintain the energy input constant as the reaction mixture continues to increase in viscosity until a high molecular weight polymeric polyester is formed.

2. The process of preparing high molecular weight condensation polyester resins derived from an organic dicarboxylic acid and a glycol which comprises forming glycol esters of the acid and condensing them at elevated temperature and reduced pressure in liquid state, said esters increasing in viscosity as they condense, while agitating said esters with a rotating agitator and supplying power to the agitator at an increasing energy level to turn said agitator until the power required to turn the agitator at the rate of rotation being used attains a desired level and then continuing to condense while reducing the rate of rotation of the agitator as the reaction mixture continues to increase in viscosity to maintain the power required to turn the agitator at a constant value until a high molecular weight polymeric polyester is formed.

3. The process of preparing high molecular weight condensation polyester resins which comprises forming a glycol ester of an acid selected from the group consisting of terephthalic acid and isophthalic acid and mixtures thereof, adding the glycol ester to a reactor and subjecting said glycol ester to condensation polymerization at a temperature in the range of from about 220° C. to about 280° C. at a pressure below about 5 millimeters of mercury pressure with the removal of glycol while mixing it with a rotating stirrer as the polymerization proceeds, said ester increasing in viscosity as it condenses and supplying power to the stirrer at an increasing energy level until the power required to turn the stirrer at the rate of rotation used attains a desired level and thereafter supplying energy to the stirrer at a constant rate to turn said stirrer while reducing the rate of rotation of the stirrer to maintain the power required to turn the agitator constant to maintain the temperature of the polymerizing material in said temperature range as the viscosity of the polymerizing ester increases until the polymer formed attains the desired degree of condensation.

4. The process of claim 3 in which the temperature of the reactants is maintained in said range by cooling the reactor.

5. The process of claim 4 in which the polyester prepared is selected from the group consisting of polymeric ethylene terephthalate, ethylene terephthalate-ethylene isophthalate copolyesters and cyclohexane dimethanol terephthalate.

6. In a process for preparing high molecular weight polyethylene terephthalate which comprises subjecting ethylene glycol terephthalate to condensation at a temperature in the range of from about 220° C. to about 280° C. at a pressure below about 5 millimeters of mercury pressure with the removal of glycol, said glycol terephthalate increasing in viscosity as it condenses, while mixing the glycol terephthalate with a rotating stirrer and supplying power to the stirrer at an increasing energy level until the power required to turn the stirrer at the rate of rotation being used attains a desired level and thereafter supplying energy to said stirrer at a constant rate to turn said stirrer while reducing the rate of rotation of the stirrer to the rate of rotation which will maintain the temperature of the polymerizing glycol terephthalate in said temperature range as the glycol terephthalate reaction mixture increases in viscosity until the high molecular weight polymer formed attains the desired degree of condensation.

7. The process for preparing high molecular weight polyester resin by the condensation of bis glycol esters of a dicarboxylic acid at a temperature in the range of from about 430° F. to about 560° F. at a pressure of from about 0.1 to about 5 millimeters of mercury pressure while agitating the reaction mixture with an agitator which comprises turning the agitator by supplying power to the agitator at a constant value to turn the agitator and removing heat from the reaction mixture to maintain the temperaure of the reaction mixture within said temperature range.

References Cited

UNITED STATES PATENTS

| | | | |
|---|---|---|---|
| 2,758,915 | 8/1956 | Vodonik | 260—75 |
| 2,779,752 | 1/1957 | Vining | 260—91.3 |
| 2,904,534 | 9/1959 | Williams et al. | 260—75 |
| 2,932,625 | 4/1960 | Burton et al. | 260—75 |
| 2,964,391 | 12/1960 | Benson | 260—75 |

FOREIGN PATENTS 220,410  2/1959  Australia.

OTHER REFERENCES

Physics for Science and Engineering, Weber, White and Manning, 1957.

Chemical Engineering, February 1957.

WILLIAM H. SHORT, *Primary Examiner.*

LOUISE P. QUAST, *Assistant Examiner.*